(12) United States Patent
Ben-Levy et al.

(10) Patent No.: US 8,514,385 B2
(45) Date of Patent: Aug. 20, 2013

(54) DEVICE AND METHOD FOR INSPECTING AN OBJECT

(75) Inventors: Meir Ben-Levy, Haifa (IL); Ophir Peleg, Moshav Amirim (IL)

(73) Assignee: Camtek Ltd, Migdal Haemeq (IL)

( * ) Notice: Subject to any disclaimer, the term of this patent is extended or adjusted under 35 U.S.C. 154(b) by 885 days.

(21) Appl. No.: 12/064,364

(22) PCT Filed: Aug. 24, 2006
(Under 37 CFR 1.47)

(86) PCT No.: PCT/IL2006/000986
§ 371 (c)(1),
(2), (4) Date: Jul. 11, 2011

(87) PCT Pub. No.: WO2007/023500
PCT Pub. Date: Mar. 1, 2007

(65) Prior Publication Data
US 2011/0310392 A1    Dec. 22, 2011

Related U.S. Application Data

(60) Provisional application No. 60/711,432, filed on Aug. 26, 2005.

(51) Int. Cl.
*G01N 21/00* (2006.01)

(52) U.S. Cl.
USPC ................. 356/237.1; 356/237.4; 356/445

(58) Field of Classification Search
USPC .................. 356/237.1–237.5, 445–448
See application file for complete search history.

(56) References Cited

U.S. PATENT DOCUMENTS

| 5,387,977 | A  | * | 2/1995  | Berg et al. ............... 356/407 |
| 5,896,195 | A  | * | 4/1999  | Juvinall et al. .......... 356/240.1 |
| 7,440,094 | B2 | * | 10/2008 | Yoo ........................ 356/237.5 |
| 2008/0174771 | A1 | * | 7/2008 | Yan et al. ................ 356/237.5 |
| 2010/0051834 | A1 | * | 3/2010 | Lopatin .................... 250/553 |

\* cited by examiner

*Primary Examiner* — Hoa Pham
(74) *Attorney, Agent, or Firm* — Reches Patents

(57) ABSTRACT

A method for inspecting an object and an inspection system, the system includes: at least one primary light source followed by at least one illumination path imaging lens adapted to direct at least one primary light beam towards an area of an inspected object; at least one secondary light source followed by at least one collimating component and at least one concentrating component adapted to direct at least one secondary light beam towards the area; wherein the at least one primary light beam and the at least one secondary light beam illuminate the area such that substantially each point within an imaged portion of the area is illuminated over a large angular range characterized by substantially uniform intensity; a collection path that comprises an image sensor, a beam splitter path and a collection path imaging lens; wherein the beam splitter is positioned between the area and between the collection path imaging lens; and wherein the at least one collimating component defines a central aperture through which the at least one primary light beam propagates.

26 Claims, 8 Drawing Sheets

Secondary Top Lenses

Collimating lens array 32"

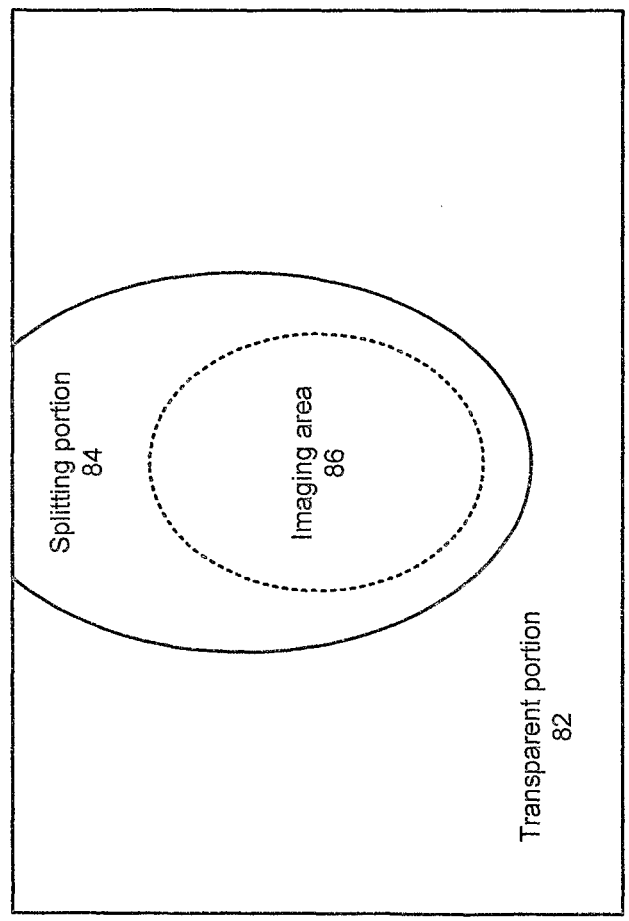

generating at least one primary light beam and at least one secondary light beam. 320 directing the at least one primary light beam towards an area of an inspected object, through a central aperture defined by at least one collimating component and collimating and directing the at least one secondary light beam towards the area. The at least one primary light beam and the at least one secondary light beam illuminate the area such that substantially each point within an imaged portion of the area is illuminated over a large angular range characterized by substantially uniform intensity. 330 collecting reflected light and scattered light from the area. The collecting includes directing light from the area towards a beam splitter, through an imaging lens and to an imaging sensor. The beam splitter is positioned between the area and between the collection path imaging lens. 340

DEVICE AND METHOD FOR INSPECTING AN OBJECT

RELATED APPLICATIONS

This patent application claims priority from U.S. provisional application serial number 60/711,432, filed 26 Aug. 2005.

FIELD OF THE INVENTION

The invention relates to systems and methods for inspecting an object, especially in optical inspection systems that inspect electrical circuits.

BACKGROUND OF THE INVENTION

Optical inspection systems can detect defects in inspected objects (such as printed circuit boards, wafers, masks and reticles) by illuminating an inspected object and processing images generated in response to the illumination.

Optical inspection systems for Printed Circuit Boards have to discriminate between materials. For example, these systems have to discriminate between insulators and conductors that are made of different materials. Each combination of insulator and conductive materials requires specific illumination conditions in order to obtain best image contrast.

Typical printed circuit board inspection systems use line based scanning that involves scanning a line of light over the printed circuit board. Line illumination does not illuminate features in a symmetrical manner.

There is a need to provide a system that illuminates a feature in a radial symmetrical manner.

SUMMARY OF THE INVENTION

An inspection system, the system includes: (i) at least one primary light source followed by at least one illumination path imaging lens adapted to direct at least one primary light beam towards an area of an inspected object; (ii) at least one secondary light source followed by at least one collimating component and at least one concentrating component adapted to direct at least one secondary light beam towards the area; wherein the at least one primary light beam and the at least one secondary light beam illuminate the area such that substantially each point within an imaged portion of the area is illuminated over a large angular range characterized by substantially uniform intensity; (iii) a collection path that comprises an image sensor, a beam splitter path and a collection path imaging lens; wherein the beam splitter is positioned between the area and between the collection path imaging lens; and wherein the at least one collimating component defines a central aperture through which the at least one primary light beam propagates.

A method for inspecting an object, the method includes: (i) generating at least one primary beam and at least one secondary beam; (ii) directing the at least one primary beam through a central aperture defined by at least one collimating component and towards an area of an inspected object; (iii) collimating and directing the at least one secondary light beam towards the area; wherein the at least one primary beam and the at least one secondary beam illuminate the area such that substantially each point within an imaged portion of the area is illuminated over a large angular range characterized by substantially uniform intensity; and (iv) sensing, by an image sensor, light that propagates from the imaged portion. of the area, towards a beam splitter positioned and through a collection path imaging lens; wherein the beam splitter is positioned between the area and between the collection path imaging lens.

BRIEF DESCRIPTION OF THE DRAWINGS

The present invention will be understood and appreciated more fully from the following detailed description taken in conjunction with the drawings in which:

FIG. 7 illustrates a lower face of a beam splitter, according to an embodiment of the invention; and FIG. 8 illustrates a method for inspecting an object, according to an embodiment of the invention.

DETAILED DESCRIPTION OF THE DRAWINGS

Various embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

The inspection system and method for inspecting an object can be used for inspecting electrical circuits such as but not limited to wafers, printed circuit boards and the like.

An inspection system that can illuminate features in a symmetrical manner and can apply both dark field and bright field detection is provided. The symmetrical illumination is achieved by illuminating a two dimensional area (and not merely illuminating a narrow line). A large angle illumination is achieved by directing at least one secondary light beam and at least one primary beam towards the same area, wherein points within an imaged portion of an illuminated area are illuminated over a large angular range characterized by substantially uniform intensity. The imaged portion of the area is imaged by a image sensor.

It is noted that the at least one primary light source and the at least one illumination path can define a primary illuminator while the
at least one secondary light source, at least one collimating component and the at least one concentrating component can define a secondary illuminator.

By positioning various secondary optical components a distance from the area that differs from the distance between the area and primary optical components, the various components can be placed within a relatively small space.

A primary light beam can include a portion that is perpendicular to the illuminated area. A secondary light beam does not include a portion that is perpendicular to the illuminated area. A primary beam is also referred to as on-axis light beam while a secondary light beam is also referred to as off-axis light beam.

It is noted that the system and method can provide one or more primary light beams and one or more secondary light beams. For simplicity of explanation the following figures illustrate a single primary light beam and multiple primary light beams.

It is noted that the system and method can be utilized in automatic, semi-automatic or manual inspection systems.

Figure 1:
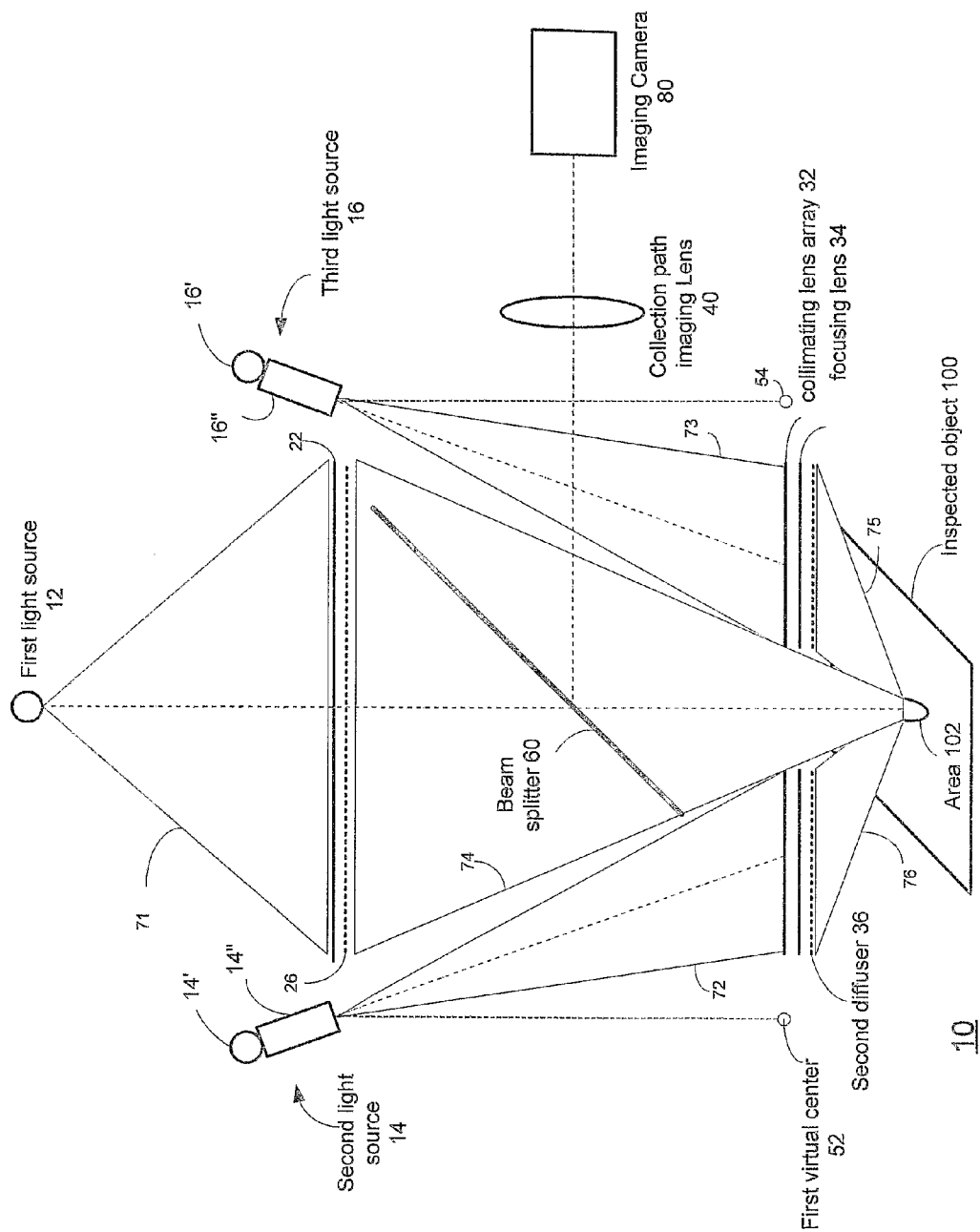
FIG. 1 illustrates a system, according to an embodiment of the invention.

FIG. 1 illustrates system 10 according to an embodiment of the invention.

FIG. 1 illustrates three light sources 12, 14' and 16' and few lenses (22, 32, 34, 40) of various types. Those of skill in the art will appreciate that the number of light sources as well as the number of lenses can vary without departing from the spirit of the invention. For example, collection path imaging lens 40 can include multiple lenses that image area 102 onto imaging camera. It is further noted that although system 10 includes a single primary path and four secondary paths that the number of secondary paths can differ than four and that there can be multiple primary paths.

System 10 directs a set of light beams 74-76 onto the same area (area 102). These light beams differ from each other by their incidence angle range. The combination of these multiple primary and secondary light beams illuminate an area such that substantially each point within an imaged portion of the area is illuminated over a large angular range characterized by substantially uniform intensity. It is noted that the illumination can include a limited angular discontinuity, for example in some angles (especially in possible shaded zones between different light beams) the illumination intensity can be much lower. It is noted that by reducing the distance between light beams the shaded zones can be almost (or completely) eliminated.

First light beam 71 is generated by first light source (also referred to as primary light source) 12 and propagates towards illumination path imaging lens 22 (also referred to as primary illuminator).

Illumination path imaging lens 22 is followed by scattering element such as first diffuser 26 that prevents the image of first source light 12 from being exactly imaged onto area 102.

The scattering elements can be diffusers, micro lens arrays, micro prisms, lenticular lenses and the like.

Illumination path imaging lens 22 and first diffuser 26 convert first light beam 71 to first focused light beam 74. First focused light beam 74 is directed towards area 102 of inspected object 100.

It is noted that first diffuser 26 can be positioned before or after illumination path imaging lens 22.

First focused light beam 74 is perpendicular to area 102. An imaginary focal point of illumination path imaging lens 22 can be positioned slightly below area 102 or above area 102, especially if area 102 is larger than a minimal cross section of first focused light beam 74.

Second light beam 72 is generated by second light source 14'. Second light source 14' includes light source 14 and an optional waveguide 14". Light from the output of waveguide 14" propagates towards collimating lens 32 (also referred to as top lens), first concentrating lens 34 (also referred to as bottom lens) and second diffuser 36. These optical elements convert second light beam 72 to second focused light beam 76. Second focused light beam 76 is directed towards area 102.

It is noted that second diffuser 36 can be positioned before or after concentrating lens 34.

Third light beam 73 is generated by third light source 16'. Third light source 16' includes light source 16 and waveguide 16". Light from the output of waveguide 16" propagates towards collimating lens array 32, first concentrating lens 34 and second diffuser 36. These optical components convert this third light beam to third focused light beam 76. Third focused light beam is directed towards area 102.

Figure 4:
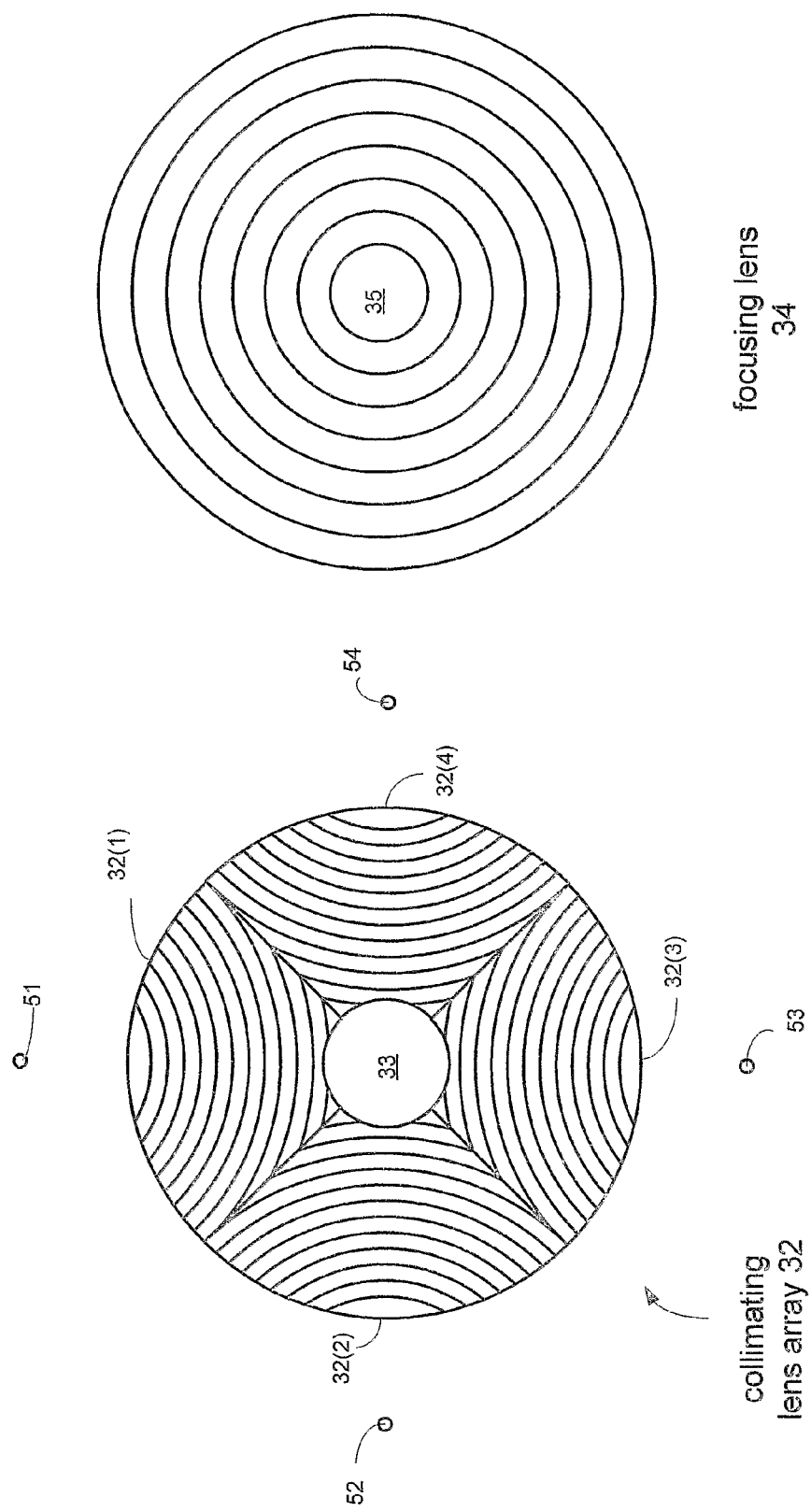
FIG. 4 illustrates collimating lens array and concentrating lens, according to an embodiment of the invention.

In addition to these mentioned above illumination paths, system 10 also includes two additional illumination paths that are were not shown for convenience of explanation. FIG. 4 illustrates four secondary light sources that belong to the mentioned above four illumination paths.

System 10 includes a collection path that includes beam splitter 60, collection path imaging lens 40 and imaging camera 80.

Conveniently, beam splitter 60 is positioned and shaped such that a primary beam passes through a splitting portion (such as splitting portion 84 of FIG. 7) of beam splitter 60 and a secondary beam passes through a transparent portion (such as transparent portion 82 of FIG. 7) of beam splitter 80. The transparent portion 62 as well as an upper face of the beam splitter 60 can be coated by an anti-reflective coating. It is noted that FIG. 7 illustrates the lower face of beam splitter 60. It is noted that other schemes can be used for reflecting light that impinge on the splitting portion. Splitting portion 84 includes imaging area 86 that represents the light that is imaged onto imaging camera 80.

Conveniently, beam splitter 60 and collection path imaging lens 40 are positioned above collimating lens array 32, second concentrating lens 34 and diffuser 36, but below first objective lens 22 and first diffuser 26. By placing collimating lens array 32, first concentrating lens 34 and second diffuser 36 below illumination path imaging lens 22, instead of positioning all these lenses (22, 32, 34) at the same imaginary horizontal plane, the size of system 10 can be decreased. In addition the imaging lens can be positioned closer to the inspected object thus allowing larger magnification factors. The collection path (also referred to as the imaging path) collects light that is reflected from area 102 and also collects light that is scattered from area 102.

Beam splitter 60 optically combines the optical axis of the primary light source with the optical axis of the collection path imaging lens.

Conveniently, at least one light source out of light sources 12, 14 and 16 is a pulsed light source. Conveniently, all these light sources are pulsed light sources that can pulsate simultaneously.

Conveniently, first light source 12 and illumination path imaging lens 22 provide a primary illumination path, while other light sources (such as 14 and 16) and other lenses (such as collimating lens array 32 and concentrating lens 34) provide secondary illumination paths.

Conveniently, collimating lens array 32 includes multiple Fresnel lens sections, whereas the number of sections can be equal to the number of secondary light sources.

A Fresnel lens section can be a portion of a circular Fresnel lens that has an optical axis. A circular Fresnel lens can include multiple concentric annular grooves (also referred to as Fresnel zones), each charactarized by a different curvature or slope.

Each optical axis coincides with a secondary light source. Referring to the examples set fourth in FIGS. 1 and 3, collimating lens array 32 includes four sections 32(1)-32(4) of Fresnel lenses, each portion has an optical axis 51-54 that is positioned below the outputs of the light guides that follow light sources 13, 14, 15 and 16.

Conveniently, first focused light beam passes through a central aperture 33 defined in first concentrating lens 32 and through a corresponding aperture 35 defined in first concentrating lens 34.

Figure 5:
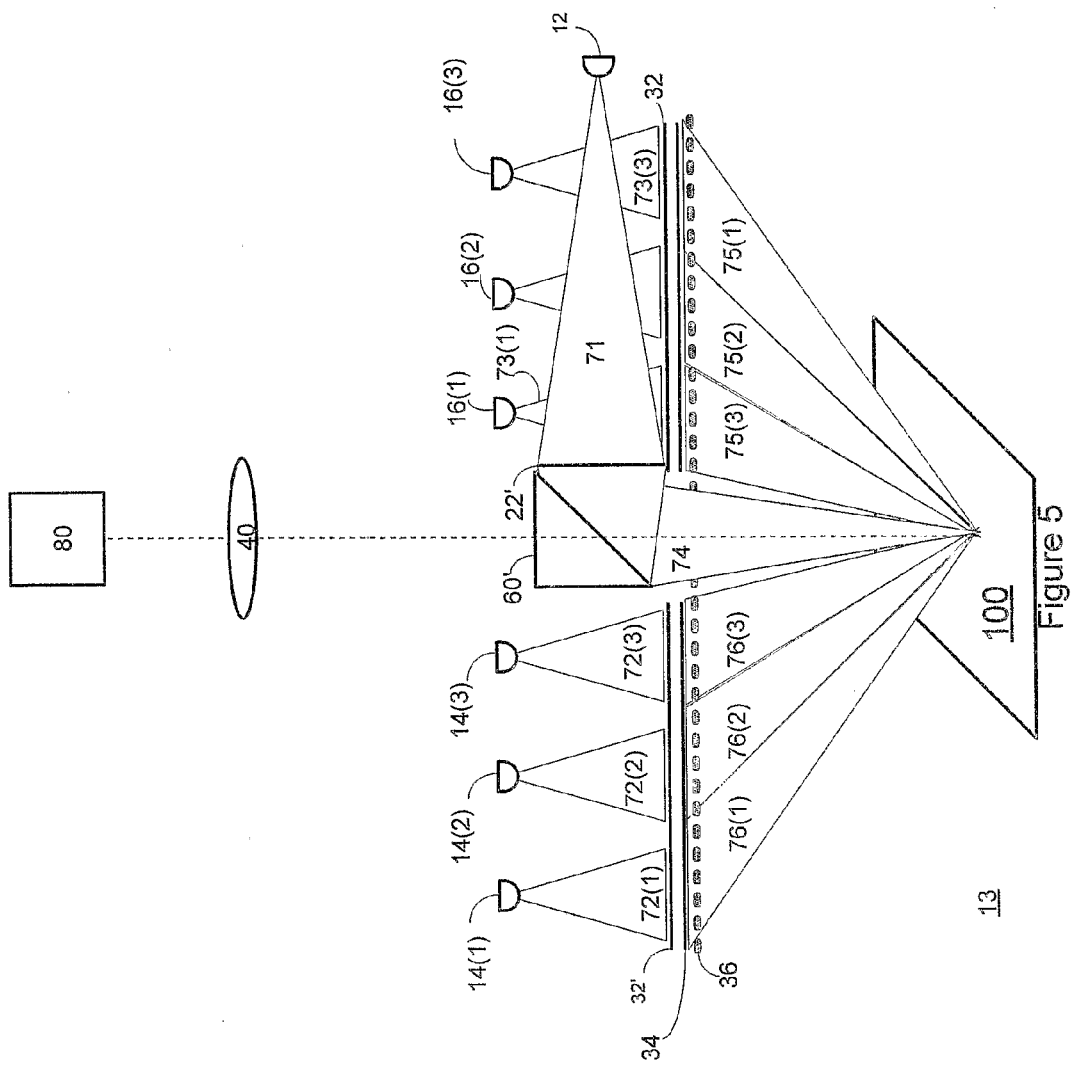
FIG. 5 illustrates a system, according to an embodiment of the invention.

Conveniently, collimating lens array 32 includes multiple Fresnel lens sections, whereas the number of sections can be equal to the number of secondary light sources. FIG. 5 illustrates collimating lens array 32" that includes multiple Fresnel lenses. Conveniently, each Fresnel lens has a center positioned below a corresponding light source.

Figure 2:
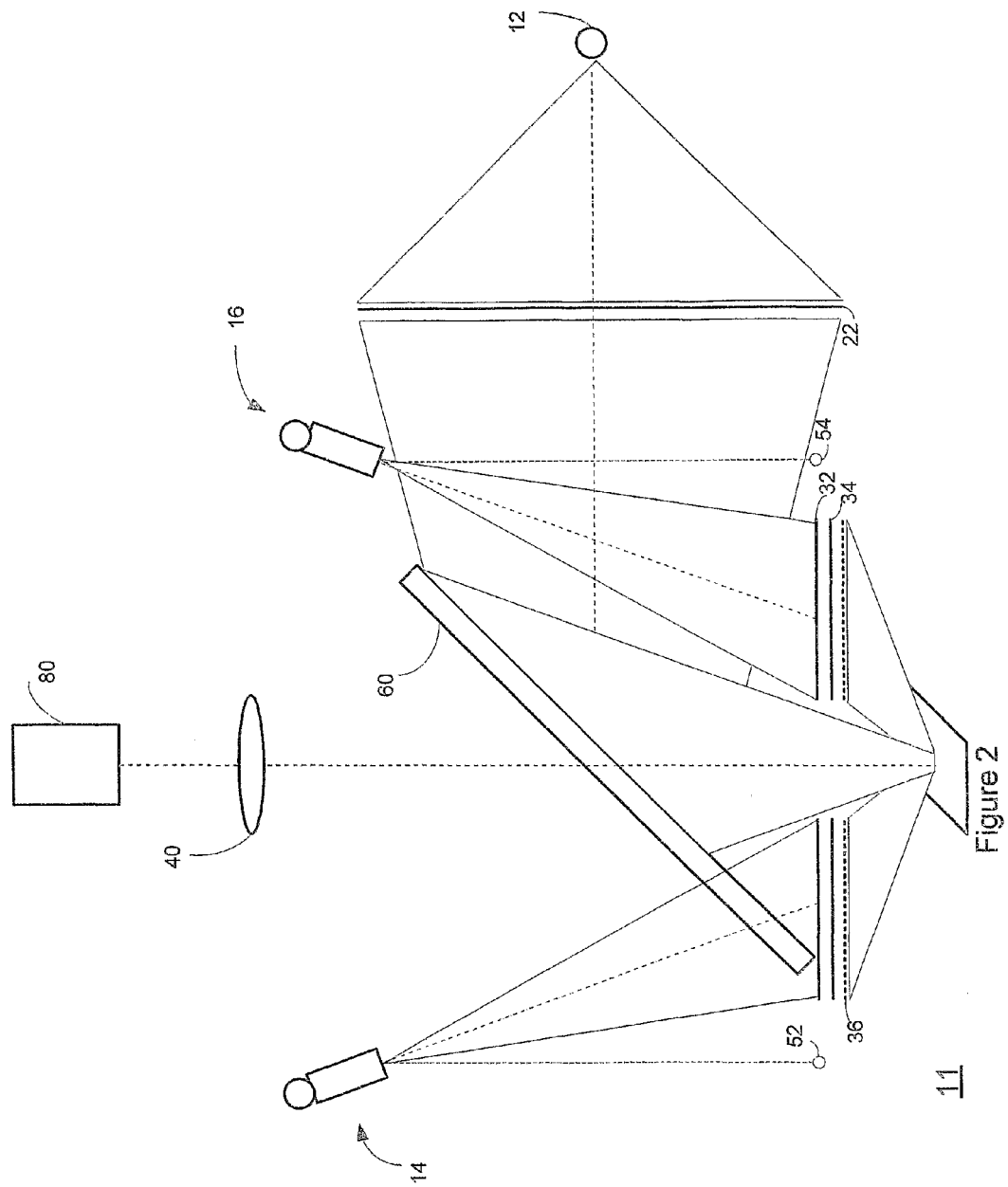
FIG. 2 illustrates a system, according to an embodiment of the invention.

FIG. 2 illustrates system 11 according to an embodiment of the invention. The primary illumination path and the collection path of system 10 (of FIG. 1) merely replaced positions.

While system 10 includes a horizontal collection path positioned between illumination path imaging lens 22 and collimating lens array 32, system 11 includes a vertical collection path and the primary illumination path is positioned between the collection path imaging lens 40 and collimating lens array 32.

FIG. 5 illustrates system 13 according to another embodiment of the invention.

System 13 includes a large number of secondary light sources (such as light sources 14(1)-14(3), 16(10-16(3)), a vertical collection path and a primary illumination path that generated a first focused light beam 74' that is substantially narrower than first focused light beam 74 of FIGS. 1 and 2.

Figure 3:
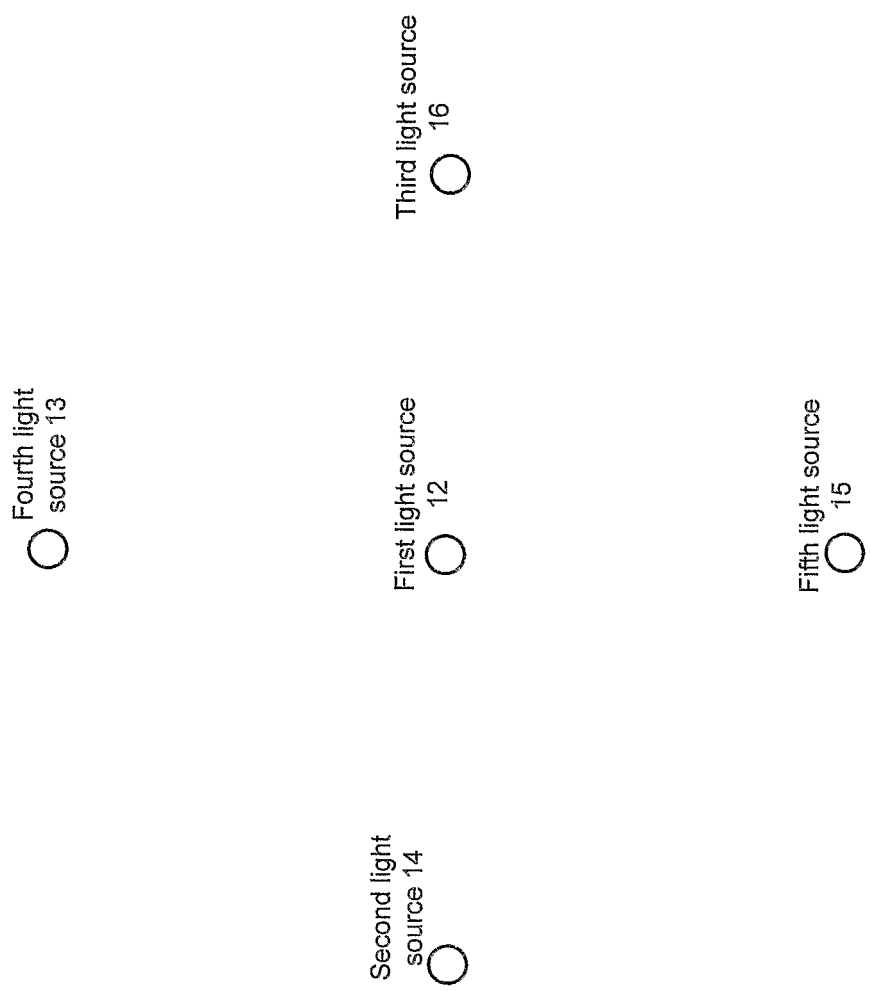
FIG. 3 illustrates a top view of a primary light source and four secondary light sources, according to an embodiment of the invention.

The inventors used the configuration illustrated in FIG. 3 for verification purposes while the configuration illustrated in either one of FIGS. 1 and 2 was used form defect detection. This is not necessarily so and an inspection system can include either one or both configurations. Either one of the mentioned above configurations can be used for verification and alternatively or additionally for defect detection.

Secondary light sources 14(1)-14(3) and 16(1)-16(3) are parallel to each other and are conveniently vertical to an imaginary optical axis of the collection path. This is in contrary to the secondary light sources 14 and 16 of FIG. 1 that are oriented in relation to the imaginary optical axis of the collection path.

Figure 6:
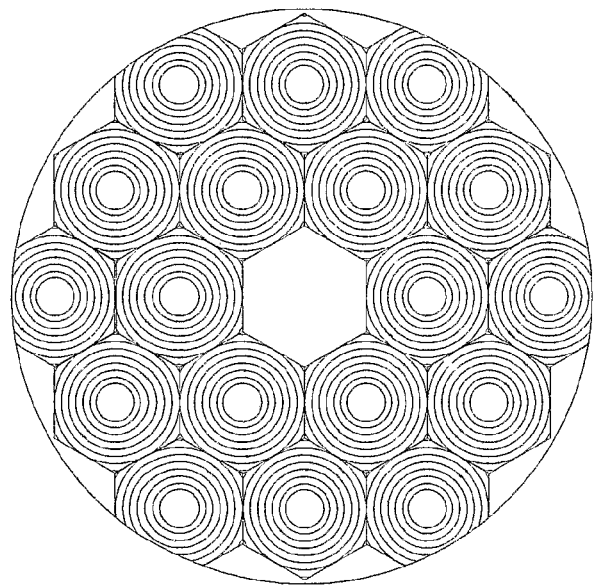
FIG. 6 illustrates a collimating lens, according to an embodiment of the invention.

Collimating lens array 32", first concentrating lens 34 and diffuser 36 are positioned between secondary light sources 14(1)-14(3) and 16(1)-16(3) and between area 102. Due to the larger number of secondary light sources the number of Fresnel lens included within collimating lens array 32" (illustrated in FIG. 6) is bigger than the number of Fresnel lens sections of collimating lens array 32 of FIG. 4.

Secondary light sources 14(1)-14(3) generate light beams 72(1)-72(3) that are converted to focused light beams 76(1)-76(3) that are directed towards area 102.

Secondary light sources 16(1)-16(3) generate light beams 73(1)-73(3) that are converted to focused light beams 75(1)-75(3) that are directed towards area 102.

System 13 also includes a beam splitter 60' that receives a primary light beam and directs it towards area 102.

FIG. 7 illustrates method 300 according to an embodiment of the invention.

Method 300 starts by stage 320 of generating at least one primary light beam and at least one secondary light beam.

Conveniently, stage 320 of generating includes generating at least one primary light pulses and at least one secondary light pulses.

Conveniently, stage 320 of generating includes simultaneously generating the at least one primary light pulses and the at least one secondary light pulses. Accordingly, at a certain moment multiple light beams illuminate the area.

Stage 320 is followed by stage 330 of directing the at least one primary light beam towards an area of an inspected object, and collimating and directing the at least one secondary light beam towards the area. The at least one primary light beam and the at least one secondary light beam illuminate the area such that substantially each point within an imaged portion of the area is illuminated over a large angular range characterized by substantially uniform intensity.

Conveniently, stage 330 includes multiple light beams at different incidence angles. An incidence angle is defined as the angle between an optical axis of a light beam and the illuminated area.

Conveniently, the collimating is followed (or preceded by) by scattering the at least one secondary light beam. The at least one secondary light beam is scattered before it reaches the area. The scattering can be implemented by a scattering element such as a diffuser.

Conveniently, the collimating includes collimating a secondary light beam by a Fresnel lens that is positioned a focal length below a light source.

Conveniently, the collimating includes collimating multiple secondary light beams by multiple Fresnel lens sections.

Conveniently, the collimating includes collimating multiple secondary light beams by multiple Fresnel lens section, wherein each Fresnel lens section has an optical axis that coincides with a corresponding light source.

Conveniently, the collimating includes directing the at least one primary light beam through a central aperture defined by the multiple Fresnel lens sections.

Conveniently, the collimating includes collimating multiple secondary light beams by multiple Fresnel lenses.

Conveniently, the collimating includes collimating multiple secondary light beams by multiple Fresnel lens sections, each having a center positioned below a corresponding light source.

Stage 330 is followed by stage 340 of collecting reflected light and scattered light from the area. The collecting includes directing light from the area towards a beam splitter, through an imaging lens and to an imaging sensor. The beam splitter is positioned between the area and between the collection path imaging lens.

Conveniently, stage 340 includes detecting light scattered and reflected from the area by the imaging sensor.

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

What is claimed is:

1. An inspection system, the system comprises:
at least one primary light source followed by at least one illumination path imaging lens adapted to direct at least one primary light beam towards an area of an inspected object;
at least one secondary light source followed by at least one collimating component and at least one concentrating component adapted to direct at least one secondary light beam towards the area;
wherein the at least one primary light beam and the at least one secondary light beam illuminate the area such that substantially each point within an imaged portion of the area is illuminated over a large angular range characterized by substantially uniform intensity;
a collection path that comprises an image sensor, a beam splitter path and a collection path imaging lens; wherein the beam splitter is positioned between the area and between the collection path imaging lens; and wherein the at least one collimating component defines a central aperture through which the at least one primary light beam propagates.

2. The system according to claim 1 wherein the at least one primary light beam and the at least one secondary light beam illuminate the area such that substantially each point within an imaged portion of the area is illuminated over a large angular range characterized by a limited angular discontinuity between a primary light beam and a secondary light beam.

3. The system according to claim 1 wherein a distance between the area and the illumination path imaging lens differs than a distance between the area and the at least one collimating component.

4. The system according to claim 1 wherein the beam splitter is positioned between the illumination path imaging lens and between the at least one collimating component.

5. The system according to claim 1 wherein multiple light beams out of the at least one primary light beam and the at least one secondary light beam are characterized by different incidence angles.

6. The system according to claim 1 wherein the system further comprises at least one light scattering component.

7. The system according to claim 1 wherein at least one collimating component is a Fresnel lens.

8. The system according to claim 1 wherein at least one light source is a pulsed light source.

9. The system according to claim 1 wherein at least two light sources are pulsed light sources that generate light pulses simultaneously.

10. The system according to claim 9 wherein each Fresnel lens section has an optical axis that coincides with a corresponding light source.

11. The system according to claim 1 wherein the at least one collimating component comprises at least one Fresnel lens section.

12. The system according to claim 1 wherein the at least one collimating component comprises at least one Fresnel lens.

13. The system according to claim 12 wherein each Fresnel lens has an optical axis that coincides with a corresponding light source.

14. The system according to claim 1 wherein the beam splitter comprises a splitting portion and a transparent portion.

15. A method for inspecting an object, the method comprises:

generating at least one primary beam and at least one secondary beam;

directing the at least one primary beam through a central aperture defined by at least one collimating component and towards an area of an inspected object;

collimating and directing the at least one secondary light beam towards the area; wherein the at least one primary beam and the at least one secondary beam illuminate the area such that substantially each point within an imaged portion of the area is illuminated over a large angular range characterized by substantially uniform intensity;

sensing, by an image sensor, light that propagates from the imaged portion of the area, towards a beam splitter positioned and through a collection path imaging lens; wherein the beam splitter is positioned between the area and between the collection path imaging lens.

16. The method according to claim 15 wherein the collimating and directing includes collimating and directing such as to illuminate the area over a large angular range characterized by a limited angular discontinuity between a primary light beam and a secondary light beam.

17. The method according to claim 15 wherein the directing comprises directing multiple light beams such as to impinge on the area at different incidence angles.

18. The method according to claim 15 further comprising scattering the at least one secondary light beam.

19. The method according to claim 15 wherein the collimating comprises collimating at least one light beam by at least one Fresnel lens.

20. The method according to claim 15 wherein the generating comprises generating at least one primary light pulse and at least one secondary light pulse.

21. The method according to claim 15 wherein the generating comprises simultaneously generating at least one primary light pulse and at least one secondary light pulse.

22. The method according to claim 15 further comprising collecting reflected light and scattered light from an imaged portion of the area.

23. The method according to claim 15 wherein the collimating comprises collimating at least one secondary light beams by at least one Fresnel lens section.

24. The method according to claim 23 wherein the collimating comprises collimating at least one secondary light beams by at least one Fresnel lens section, wherein at least one Fresnel lens section has an optical axis that coincides with a corresponding light source.

25. The method according to claim 15 wherein the collimating comprises collimating at least one secondary light beams by at least one Fresnel lens.

26. The method according to claim 15 wherein the collimating comprises collimating at least one secondary light beams by at least one Fresnel lens having an optical axis that coincides with a corresponding light source.

* * * * *